March 24, 1936.    J. F. MERKEL    2,035,395
LIGHT SIGNAL
Filed June 3, 1929    3 Sheets-Sheet 1

INVENTOR
J. F. Merkel,
BY Neil D. Preston,
his ATTORNEY

March 24, 1936.    J. F. MERKEL    2,035,395
LIGHT SIGNAL
Filed June 3, 1929    3 Sheets-Sheet 2

INVENTOR
J. F. Merkel,
BY Neil D. Preston,
his ATTORNEY

March 24, 1936.   J. F. MERKEL   2,035,395
LIGHT SIGNAL
Filed June 3, 1929   3 Sheets-Sheet 3

INVENTOR
J. F. Merkel,
BY
his ATTORNEY

Patented Mar. 24, 1936

2,035,395

UNITED STATES PATENT OFFICE 2,035,395

LIGHT SIGNAL

Joseph F. Merkel, Rochester, N. Y., assignor to General Railway Signal Company, Rochester, N. Y.

Application June 3, 1929, Serial No. 368,103

5 Claims. (Cl. 177—327)

This invention relates to signals particularly adapted for railway use, and has more specific reference to a direct current railway signal giving a plurality of indications.

It has been found in practice, that railway light signals are made much more efficient by the use of reflectors. However, to eliminate the false indications which often occur due to the reflection of external light sources, signals have been developed which have color screens, placed between the lens and the internal source of light with its reflector, such for example as set forth in pending application Ser. No. 128,437, filed August 10, 1926. Such a combination as referred to in this pending application gives true indications whether due to internal or external light sources.

The object of this invention, is to provide a unit signal giving a plurality of indications which are obtained by interposing suitable color screens between the lens of a signal and the internal source of light, these color screens being moved from the most restrictive indicating position, to the less restrictive indicating positions by novel means as set forth in this invention. It is also proposed that the control means for these color screens shall receive its motive power from the armatures of neutral relay magnets incorporated within the signal structures.

Other objects, purposes and characteristic features will in part be apparent from the accompanying drawings and in part pointed out as the description of the invention progresses.

In describing the invention in detail, reference will be made to the accompanying drawings in which:—

Figure 1:
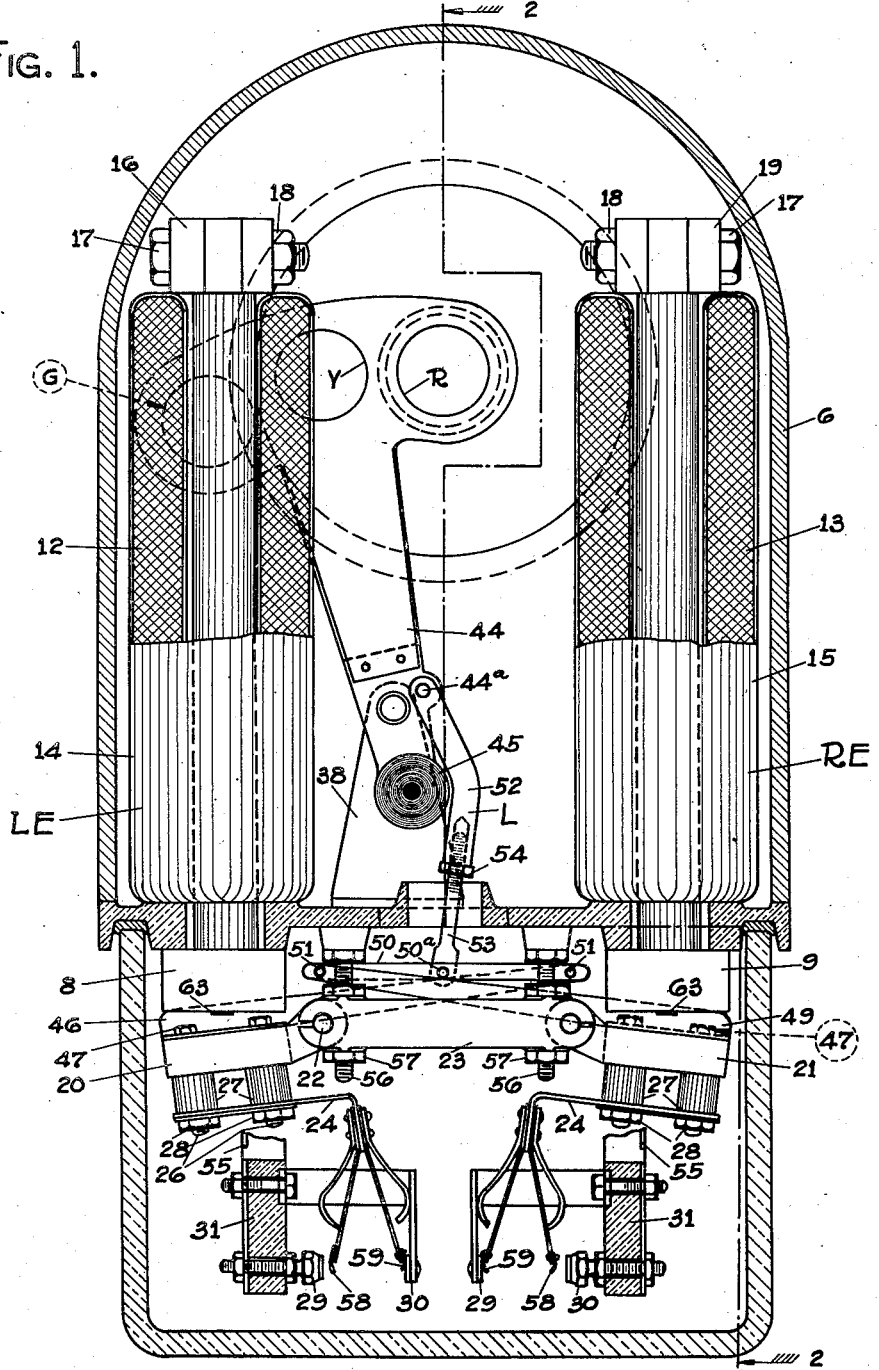
Fig. 1 is a section on lines 1—1 of Fig. 2, with parts shown in elevational section, of a three indication signal constructed in accordance with this invention.
Figure 2:
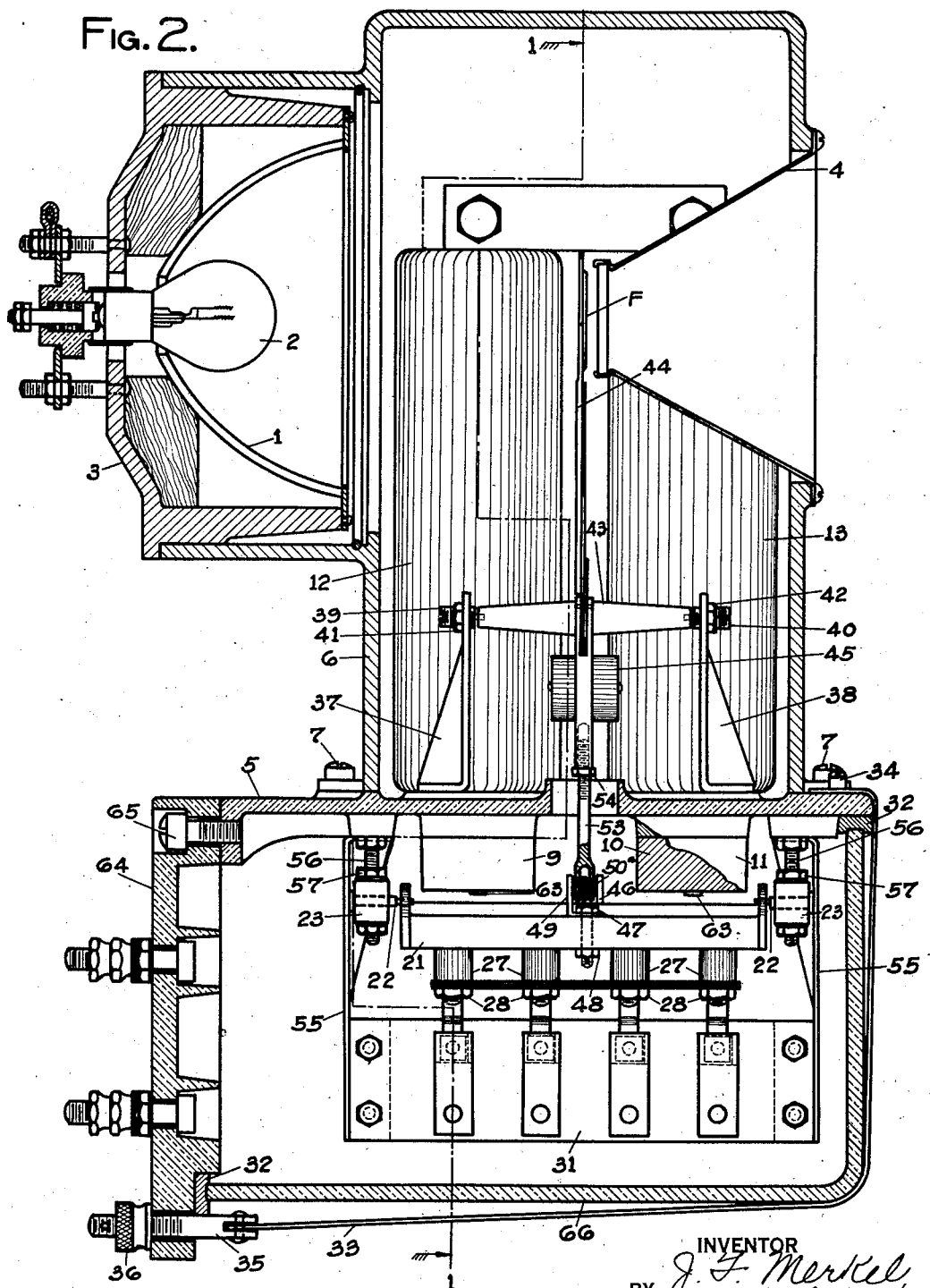
Fig. 2 is a section on line 2—2 of Fig. 1, with parts shown in elevation, of the three indication signal as shown in Fig. 1.
Figure 3:
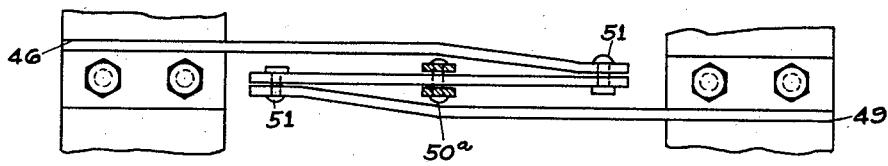
Fig. 3 is a plan view of a floating lever arrangement as attached to armatures of a motor control.
Figure 4:
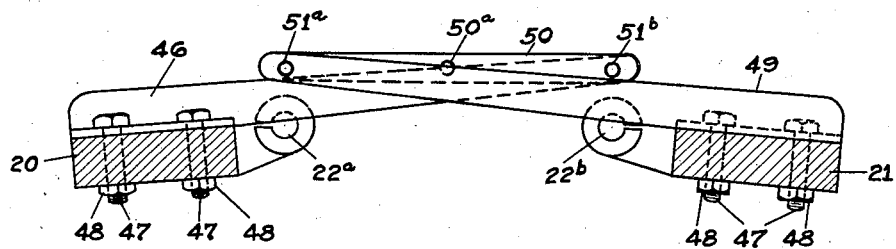
Fig. 4 is a side view of the floating lever arrangement as shown in Fig. 3.

The signal used for showing one embodiment of the present invention includes a plurality of color screens, mounted upon a movable member which is controlled by the joint action of two sets of neutral electro-magnets. This movable member passes between a light source and a lens unit (not shown) at a focal point of a reflector, all of which comprises the light projecting optical device. Each set of neutral electro-magnets control a plurality of movable contacts which make or break with certain other fixed contacts.

Referring now to the drawings, color screens or roundels R, Y and G are mounted upon a movable member 44, which passes through the focal point F of an elliptical reflector, there being an incandescent bulb 2, held in position at the focal point of the conjugate foci included within the reflector 1, by means of a suitably adjustable socket arrangement mounted upon the casing 3. The function and arrangement of the light projecting optical device is more fully described in the above referred to application of O. S. Field, Serial No. 128,437, filed August 10, 1926. It is considered sufficient for the description of this invention, to show that the light rays from the light source and reflector meet at the focal point F which is at the center of the color screen placed between the lamp unit and the lens unit. The light rays then spread from this focal point F passing through a conical shield 4 to the lens unit (not shown)

A substantial mounting and housing is provided for the light projecting combination, lens unit and circuit controlling means, by the base plate 5, fastened to the case 6 by means of the tap bolt 7.

The base plate 5 also serves for mounting the right and left hand electro-magnets RE and LE, which are composed of four magnet pole pieces 8, 9, 10 and 11, which have mounted upon them four coils 12, 13, 14 and 15, respectively. These pole pieces and coils are grouped to form the electro-magnets LE and RE with the magnetic circuit of magnet LE being completed by bar 16 connected to the pole pieces 8 and 10 by bolts 17 and nuts 18 and with the magnetic circuit of the electro-magnet RE being completed by the bar 19 being connected to pole pieces 9 and 11 by bolts 17 and nuts 18. The electromagnet LE has associated with it below its pole face the armature 20, and the electro-magnet RE has associated with it an armature 21. These armatures 20 and 21 are mounted on suitable trunnions 22, supported by links 23, which are adjustable, in respect to the base plate 5, by means of threaded spindles 56 and lock nuts 57. There is a residual pin 63, which determines the space between the armatures and their respective pole pieces, when said armatures are in energized positions. Each armature also, has associated therewith a group of contact fingers 24 which are mounted thereon by means of studs 26, insulating bushings 27, and nuts 28. These contacts 24 have front and back movable contacts 58 and 59, respectively, which engage with fixed contacts 29 and 30, with said fixed contacts mounted upon a suitable insulating member such as block 31, connected to the base plate 5 by suitable brackets 55.

Also, mounted on the base plate 5 is the insulated terminal board 64 being connected by means of tap bolts 65. This terminal board 64 serves as a part of the enclosure for the contact and motor mechanisms, which enclosure is completed by a cover 66, being preferably made of glass which is mounted against the base plate 5 and terminal board 64, sealed by the felt bushing 32, and held in position by the metal strip 33. This metal strip 33 is attached to the base plate 5 by the lug 34 and adjustably tightened as it is attached to the terminal board 64, by the bolt 35 and thumb nut 36.

Mounted between the two electro-magnets LE and RE are the brackets 37 and 38 which support stud screws 39 and 40 which are locked into position by nuts 41 and 42. These stud screws serve as bearings for the axle 43, which supports the movable member 44 and counterweight 45. This movable member 44 which may be moved to one of three positions in front of the conical shield 4, carries a suitable distinctive color screen for each of the three positions, such as the red, yellow and green roundels R, Y and G, respectively.

The armature 20 has attached thereto, the lever 46, by bolts 47 and nuts 48. Also, the armature 21 has attached thereto, by bolts 47 and nuts 48, the lever 49. The extremities of these levers 46 and 49 are interconnected by the floating lever 50, being pivoted by rivet bearings 51, so positioned that pivot points 51$^a$ and 51$^b$ coincide on a horizontal axis with pivot points 22$^a$ and 22$^b$ respectively, when the levers 46, 49 and 50 assume parallel positions. An adjustable lever L or connecting link composed of member 52 and member 53 being threaded together and substantially locked by lock nut 54, interconnects the vane 44 from a point 44$^a$ which is eccentric with the axis of vane 44, with the floating lever 50 at a pivot point 50$^a$.

Thus it is seen, that as armature 20 is picked up by its control electro-magnet LE, the lever 46 is brought to a horizontal position in such a manner that the floating lever 50 has a slanting direction, which is parallel to the lever 49. This brings the pivot point 50$^a$ of lever 50, to a position that is half way between its normal position and the position which it is in when both armatures 20 and 21 are energized. With the armatures 20 and 21 both in energized positions due to the energization of their control electro-magnets LE and RE, the pivot point 50$^a$ will be in line with the pivot points 22$^a$ and 22$^b$ of armatures 20 and 21 respectively. Similarly, as the armature 21 is picked up to an energized position while the armature 20 remains in a de-energized position, the pivot point 50$^a$ will again assume its half-way position. Thus, it is understood, that the vane 44 will assume three positions as it is directly controlled by the lever L, which is connected to lever 50 at pivot point 50$^a$, these three positions being determined by whether the armatures 20 and 21 are both in a de-energized position or whether one armature is in a de-energized position and one in an energized position, or whether both armatures are in an energized position.

The color screens, or roundels R, Y and G are placed at predetermined points upon the vane 44, so that a particular roundel is in a position, with the focal point F coinciding with its own physical center, for each of the three positions which the member 44 assumes. The order of the roundels, R, Y and G is so arranged, that the most restrictive indication, red in this illustration, is displayed when the armature 20 and 21 are both de-energized; that the caution indication yellow in this illustration, is displayed when either one of the armatures 20 and 21 is energized and the other is de-energized; and that the clear or proceed indication, in this illustration green, is displayed when both of the armatures 20 and 21 are energized.

Figure 5:
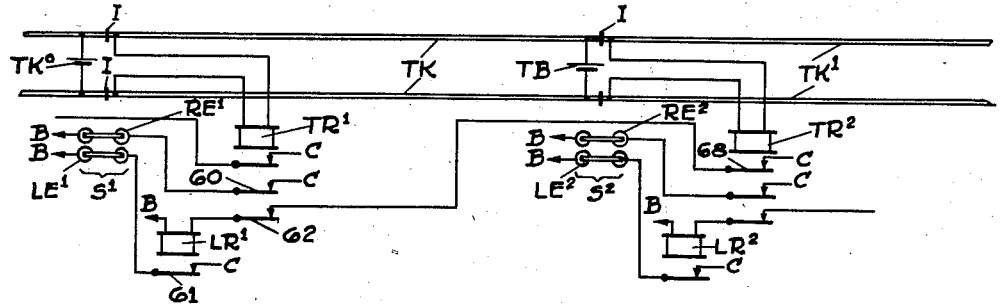
Fig. 5 is a view showing typical circuit connections in which the signal of the present invention can be applied to a railroad track circuit.

Referring now to Fig. 5, there is shown a track section TK with direction of traffic in an eastward direction. This track section TK is insulated from a preceding track section TK$^0$ by insulating joints I and from the next succeeding track section TK$^1$ by insulating joints I$^1$. At the entrance end to the track section TK is a suitable signal location which is but diagrammatically represented by the two electro-magnets represented by LE$^1$ and RE$^1$ of a unit signal S$^1$ as included in the present invention as described. Likewise, at the signal location at the exit end of track section TK is the usual track battery TB, and at the entrance to track section TK$^1$ is located a unit signal S$^2$, as included within the invention, having electro-magnets LE$^2$ and RE$^2$. The circuits are shown as being supplied with suitable potential from any convenient source being represented by the character B, with the opposite polarity represented by the reference character C. The signal location S$^1$ has associated therewith, the track relay TR$^1$ and the line relay LR$^1$. The signal location S$^2$ has associated therewith, similar relays having suitable exponents.

The track relay TR$^1$ is held energized by its track battery TB, and in a similar manner the track relay TR$^2$ is held energized by its respective track battery. The normal conditions are as shown in Fig. 5, so that as a train approaches the signal location S$^1$, in an east bound direction it receives a clear indication, as both electro-magnets LE$^1$ and RE$^1$ are energized.

The electro-magnet RE$^1$ is energized through a circuit from the positive terminal B of a suitable battery source, through front contact 60 of relay TR$^1$ to common, while the electro-magnet LE$^1$ is energized through a circuit from the positive terminal B of a suitable battery source through front contact 61 of relay LR$^1$ to common. The line relay LR$^1$ is energized through a circuit from the positive terminal B of a suitable battery source, through front contact 62 of relay TR$^1$, through a line wire to signal S$^2$ and through front contact 68 of relay TR$^2$. The circuits for electro-magnets RE$^2$ and LE$^2$ of signal S$^2$ are exactly identical with the circuits of signal S$^2$ being carried through their corresponding relays.

As the train enters the track section TK, the signal S$^1$ then displays its most restrictive indication (red), because the relay TR$^1$ is shunted, opening the circuit of electro-magnet RE$^1$ through the front contact 60 of relay TR$^1$ and opening the circuit of electro-magnet LE$^1$ through the front contact 61 of relay TR$^1$ as its circuit is opened by the front contact 62 of relay TR$^1$.

When the train enters track section TK¹ the track relay TR² is energized, causing the signal S² to display its most restrictive indication (red), and the track relay TR¹ is energized, causing the energization of the electro-magnet RE¹ which results in the signal S¹ displaying the caution indication. After the train has passed into the next succeeding track section TK² (not shown) the signal S¹ will display a clear indication and the signal S² will display a caution indication. Then when the train has entered track section TK³ (not shown) signals S¹ and S² will both display clear or proceed indications.

The above rather specific description of one form of the present invention is given solely by the way of illustration, and is not intended in any manner whatsoever in a limiting sense. Obviously this invention can assume many different physical forms and is susceptible of numerous modifications and all such forms and modifications are intended to be included in this application as come within the scope of the appended claims.

Having described my invention, I now claim:—

1. In a light signal, in combination, two spaced electro-magnets, a pole shoe for each magnet, a pivoted armature attractable by each pole shoe, an armature lever connected to each armature and extending toward the other armature sufficiently to overlap each other, a floating lever interconnecting the ends of the armature levers, a spectacle bearing color screens pivoted above the floating lever, and a connecting link connecting the spectacle and the floating lever.

2. In a light signal, in combination, two spaced pairs of electro-magnets, a pole shoe for each magnet, a pivoted armature attractable by each pair of pole shoes, an armature lever connected to each armature and extending toward an intermediate part of the other armature, a floating lever interconnecting the ends of the armature levers, a spectacle bearing color screens pivoted above the floating lever in a plane passing between each bar of electro-magnets, and a connecting link connecting the spectacle and the floating lever to swing the spectacle from between one pair of magnets to between the other pair of magnets.

3. In a light signal, in combination, two spaced pairs of electro-magnets, a pole shoe for each magnet, a pivoted armature attractable by each pair of pole shoes, an armature lever connected to each armature and extending toward an intermediate part of the other armature, the levers each extending beyond the end of the other; a floating lever interconnecting the ends of the armature levers, a spectacle bearing color screens pivoted above the floating lever in a plane passing between each pair of electro-magnets, and a connecting link connecting the spectacle and the floating lever to swing the spectacle from between one pair of magnets to between the other pair of magnets.

4. In a light signal, in combination, two spaced pairs of electro-magnets, a pivoted armature attractable by each pair of magnets, an armature lever connected to each armature and extending generally toward an intermediate part of the other armature, a floating lever interconnecting the ends of the armature levers, a light controlling member pivoted above the floating lever, a connecting link connecting the member and the floating lever in a manner to rock the member on its pivot, the member being positioned to move, when so rocked, from between one pair of magnets to between the other pair of magnets.

5. In a light signal, in combination, two spaced pairs of electro-magnets, a pivoted armature attractable by each pair of magnets, an armature lever connected to each armature and extending generally toward an intermediate part of the other armature a sufficient distance to each overlap the other, a floating lever interconnecting the ends of the armature levers, a light controlling member pivoted above the floating lever, a connecting link and a crank connecting the member and the floating lever in a manner to rock the member on its pivot, when the floating lever is moved by an armature lever, the member being positioned to move when so rocked from between one pair of magnets to between the other pair of magnets.

JOSEPH F. MERKEL.